(12) United States Patent
Sato (10) Patent No.: US 6,176,123 B1
(45) Date of Patent: Jan. 23, 2001

(54) DETECTING APPARATUS OF ENGINE ROTATION ANGLE

(75) Inventor: Toshiya Sato, Isehara (JP)

(73) Assignee: Nissan Motor Co., Ltd., Kanagawa (JP)

( * ) Notice: Under 35 U.S.C. 154(b), the term of this patent shall be extended for 748 days.

(21) Appl. No.: 08/494,516

(22) Filed: Jun. 26, 1995

(30) Foreign Application Priority Data

Jun. 27, 1994 (JP) .................................................. 6-144805
Jun. 12, 1995 (JP) .................................................. 7-144762

(51) Int. Cl.$^7$ ................................................ G01M 15/00
(52) U.S. Cl. ............................................ 73/117.3; 73/116
(58) Field of Search ................................. 73/116, 118.1, 73/117.2, 117.3, 119 R (56) References Cited

U.S. PATENT DOCUMENTS

| | | | |
|---|---|---|---|
| 4,274,141 | * 6/1981 | Tokuda et al. | 364/431 |
| 4,302,815 | * 11/1981 | Tedeschi et al. | 73/116 |
| 4,425,812 | * 1/1984 | Williams | 74/6 |
| 4,700,305 | * 10/1987 | Lotterbach et al. | 364/431.03 |
| 4,707,791 | * 11/1987 | Hmelovsky et al. | 364/431.04 |
| 4,782,692 | * 11/1988 | Peden et al. | 73/117.3 |
| 5,485,374 | * 1/1996 | Takaku et al. | 73/117.3 |

FOREIGN PATENT DOCUMENTS

| | | |
|---|---|---|
| 58-19532 | 2/1983 | (JP) . |
| 63-183375 | 11/1988 | (JP) . |

* cited by examiner

*Primary Examiner*—Eric S. McCall
(74) *Attorney, Agent, or Firm*—McDermott, Will & Emery (57) ABSTRACT

In an engine provided with a starter motor for putting the teeth of the starter pinion into the teeth of the ring gear coupled with the crankshaft, the apparatus is intended to detect continuously the rotating direction of the engine in a limited range. A magnetic sensor for outputting a signal depending on the passing of teeth in the specific range of the ring gear is provided. This specific range is determined so as not to overlap with the wear region of the ring gear worn by engagement with the starter pinion, so that the detecting precision of angle is enhanced by preliminarily eliminating the effect of the wear of the teeth of ring gear on the angle detecting precision.

8 Claims, 12 Drawing Sheets

DETECTING APPARATUS OF ENGINE ROTATION ANGLE

FIELD OF THE INVENTION

This invention relates to a detecting apparatus of engine rotation angle.

BACKGROUND OF THE INVENTION

An electronically controlled automobile engine is generally provided with a sensor for detecting the rotating state of the engine.

As a kind of such sensor, a crank angle sensor for detecting the specific rotating position of the engine crankshaft is disclosed for example in Jikkai Sho. 58- 19532 published in 1983 and Tokkai Sho. 63-183375 published in 1988 by the Japanese Patent Office.

The crank angle sensor detects only a specific rotating position a so called reference position, but it may be desired to detect continuously the rotation angle of the crankshaft in a specific range from the reference position. Such necessity arises, for example, when determining misfiring of engine. In order to determine misfiring in a cylinder, the angular velocity of the crankshaft in the specific range from the reference position corresponding to the cylinder is detected, then the detected angular velocity is compared with the previously detected angular velocity in the same range or with the angular velocity detected in other specific range. When a speed drop more than a predetermined value is found in this comparison, the corresponding cylinder is determined to have misfired.

To obtain an angular velocity, the rotation angle of the crankshaft must be detected continuously, which is realized, for example, by detecting passing of teeth of a ring gear mounted on the engine crankshaft by a magnetic sensor, and counting the number of passing teeth.

The ring gear is a gear for starting up the engine by engaging with a pinion of a starter motor when starting up the engine. The magnetic sensor is provided oppositely to the teeth of the ring gear, detects changes of its own magnetic field by passing of teeth of the ring gear, and outputs a pulse signal. Therefore, by counting the pulses of the signal after output of the reference position signal, the rotation angle of the crankshaft from the reference position is continuously detected.

However, the ring gear is gradually worn by contact with the pinion upon start of engine, and accordingly the output voltage of the magnetic sensor may drop or the output voltage ratio may vary. In such a case, the detection precision of the rotation angle may also decrease.

SUMMARY OF THE INVENTION

It is therefore a primary object of this invention to enhance the durability of such a rotation angle detecting apparatus that is applied to the ring gear of an engine.

It is another object of this invention to enhance the detection precision of the rotation angle detecting apparatus.

In order to achieve the above objects, this invention provides an apparatus for continuously detecting a rotation angle in a specific range of a crankshaft of such an engine that has a piston reciprocating between a top dead center and bottom dead center. The apparatus comprises a ring gear having teeth and coupled with the crankshaft, a starter motor for rotating the ring gear, a starter pinion coupled with the motor and having teeth to be engaged with the ring gear teeth when starting up the engine, a magnetic sensor for outputting a signal according to the passing of teeth in a specific range of the ring gear which is set so as not to overlap with a wear region of the ring gear teeth which is worn due to engagement with the pinion, and a mechanism for detecting a rotation angle of the crankshaft based on the signal.

The wear region is either a region to be engaged with the teeth of the pinion at a point where a rotating resistance of the engine becomes large when starting up the engine, or a region to be engaged with the teeth of the pinion when starting up the engine.

In the latter case, the magnetic sensor is preferably installed at either a first position slightly rotated from the position of the starter motor in the rotating direction of the ring gear, or a second position rotated 180 degrees around the center of the ring gear from the first position.

It is also preferable that the apparatus further comprises a sensor for outputting a reference signal corresponding to a specific rotation position of the crankshaft and the detecting mechanism starts detecting the rotation angle with the reference signal.

It is also preferable that the apparatus further comprises a mechanism for detecting a rotation speed of the crankshaft from the signal output by the magnetic sensor.

The details as well as other features and advantages of this invention are set forth in the remainder of the specification and are shown in the accompanying drawings.

DESCRIPTION OF THE PREFERRED EMBODIMENTS

Figure 1:
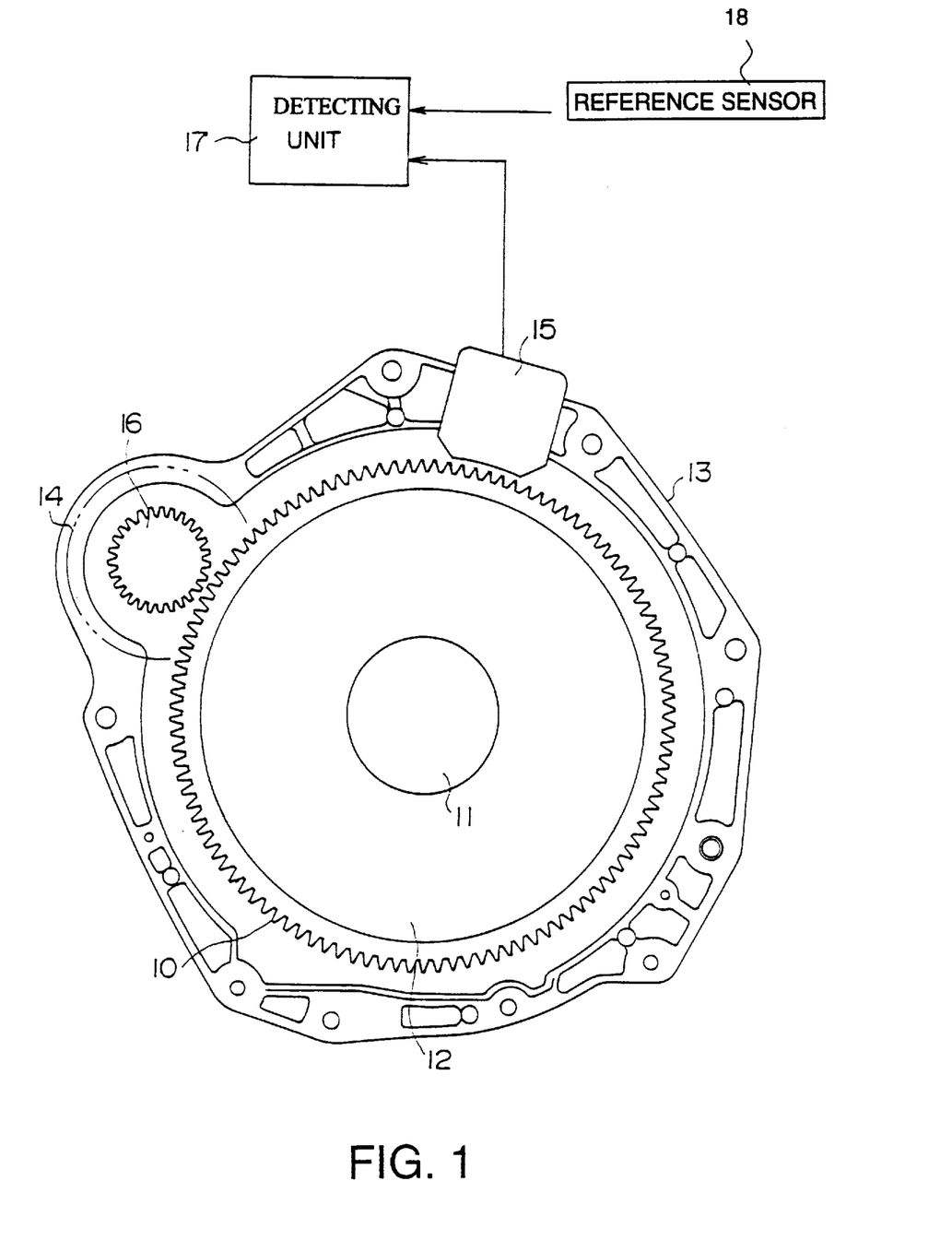
FIG. 1 is a schematic diagram of a rotation angle detecting apparatus according to this invention.

Referring to FIG. 1 of the drawings, a flywheel 12 is attached to a crankshaft 11 of a reciprocating type four-cycle multiple-cylinder engine, and a ring gear 10 is fixed integrally on the outer circumference of the flywheel 12.

A starter motor 14 is provided in a housing 13 for enclosing the flywheel 12, and a magnetic sensor 15 is disposed at a position confronting the teeth of the ring gear 10.

The starter motor 14, along with a starter pinion 16, moves parallel to the crankshaft 11 as the engine ignition switch is turned on, and causes the teeth of the starter pinion 16 to engage with the teeth of the ring gear 10. After this engagement, by rotating the starter motor 14, the flywheel 12 and crankshaft 11 integrated with the ring gear 10 are rotated.

To identify the engine cylinders, for example, to determine which cylinder is at which stroke cycle, a reference sensor 18 is also provided for outputting a REF signal at a specific rotating position of the crankshaft.

The reference sensor 18 detects passing of protrusions provided at specific positions of the ring gear 10. Each protrusion corresponds to a specific position of a piston in each cylinder, for example, the protrusion is provided at a position 70 degrees before the top dead center (TDC) of each cylinder. The reference sensor 18 thus outputs a plurality of REF signals to a detecting circuit 17 while the crankshaft 11 makes one revolution. Since the reference sensor 18 is a sensor for detecting only the specific rotation position of the crankshaft 11, it does not have a function of continuously detecting the rotation angle.

On the other hand, the magnetic sensor 15 is provided in order to continuously detect the rotation angle of the engine in a specific range from the reference position defined by the REF signal. The magnetic sensor 15 detects passing of each tooth of the ring gear 10 through the change in the magnetic flux of the magnetic sensor 15, and outputs a corresponding pulse signal to the detecting circuit 17. The ring gear 10 has a large number of teeth, and by counting the pulses, the rotation angle of the crankshaft 11 is detected continuously at fine intervals. The reference sensor may be a sensor 18 similar to the magnetic sensor 15, or the reference sensor 18 and magnetic sensor 15 may be assembled in the same housing.

A mentioned above, when obtaining an angular velocity of the crankshaft in a specific section, it is not necessary to count the teeth of the ring gear 10 in the whole circumference. What is required for this purpose is to count the teeth in only a portion of the ring gear 10. This invention is exclusively applied to an angle detecting apparatus that is arranged to accomplish such a purpose.

Wear of the teeth of ring gear 10 will now be described.

Figure 7:
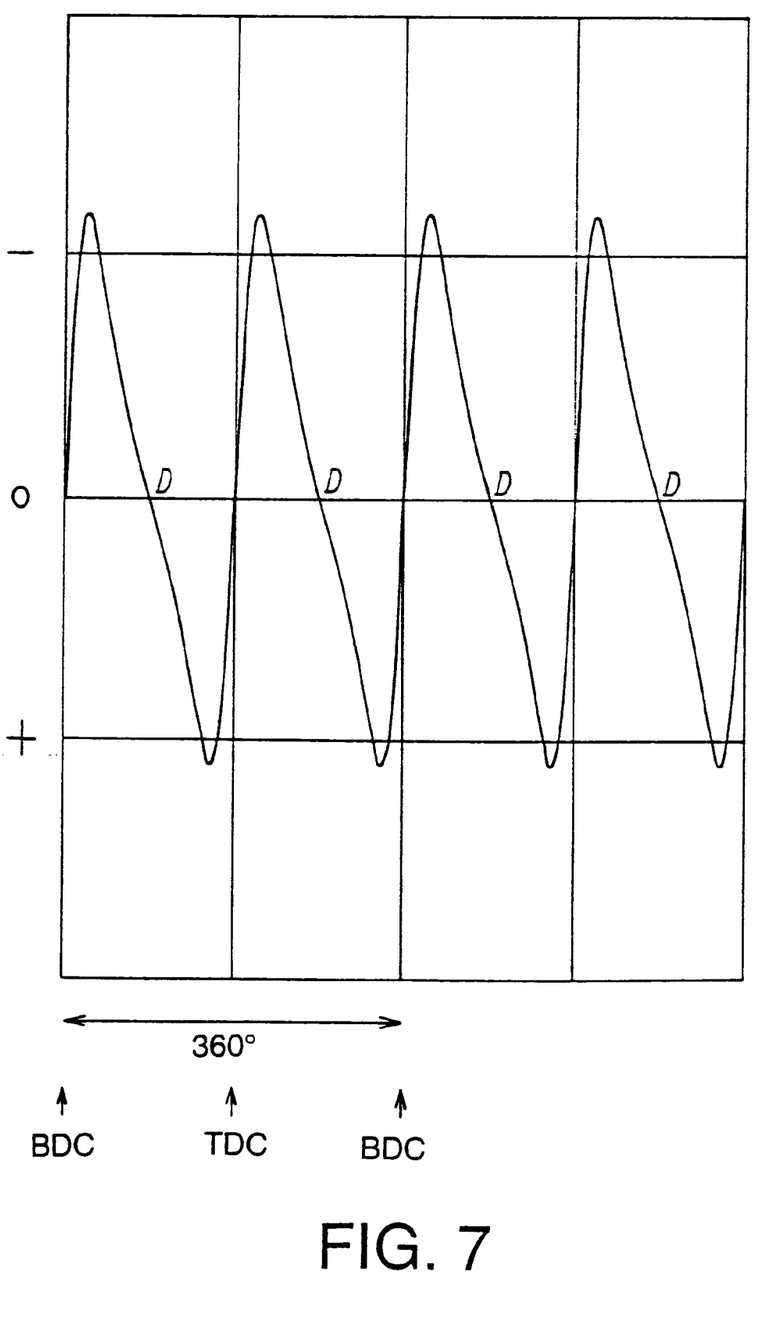
FIG. 7 is a graph showing a relation between a rotating resistance and rotating position of the engine when starting up.

The rotating resistance while the engine is not running is, as shown in FIG. 7, large (positive) in a specific region before the top dead center (TDC) of the piston, and is negative in a specific region after the TDC of the piston.

Accordingly, the engine stops at position D where the rotating resistance after the top dead center of the piston is 0. If the rotating resistance is 0, however, it does not stop in the region changing from positive to negative value. The stopping positions are two in the case of four-cylinder engine and three in the case of six-cylinder engine, per revolution of the engine. FIG. 7 shows the characteristic of the four-cylinder engine, and the four-cylinder engine stops at intermediate positions D of the top dead center and bottom dead center of piston (ATDC90° and BTDC90° ).

Incidentally, the ring gear 10 receives a large torque from the starter pinion 16, when it is in a specific region of large rotating resistance before the TDC of the piston, during cranking operation by the starter motor 14.

Figure 2:
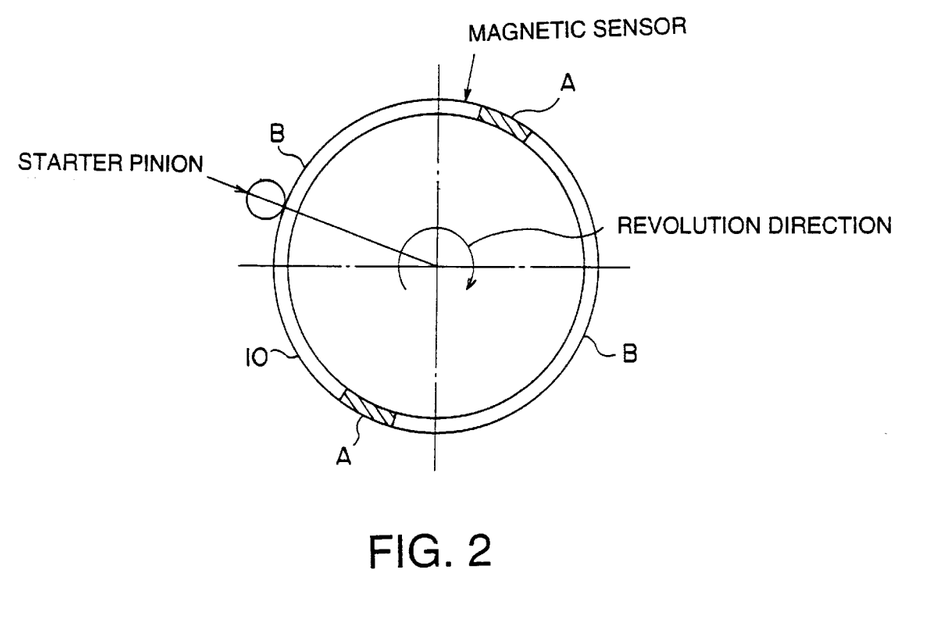
FIG. 2 is a diagram showing a rotation position of a ring gear when the engine is stopped.

Hence, showing the wear sections of the ring gear 10 on the basis of the engine stopped state, in the case of four-cylinder engine, the region of about 90° before the position of the starter motor 14 receives a large torque from the starter pinion 16 and is a wear section A of the ring gear 10 where wearing is promoted as shown in FIG. 2. In this case, the wear section A occurs in two positions on the circumference. In the case of a six-cylinder engine, the region of about 60° before the position of the starter motor 14 is the wear section A of the ring gear 10 where wearing is promoted. In this case, the wear section A occurs in three positions on the circumference.

Figure 3:
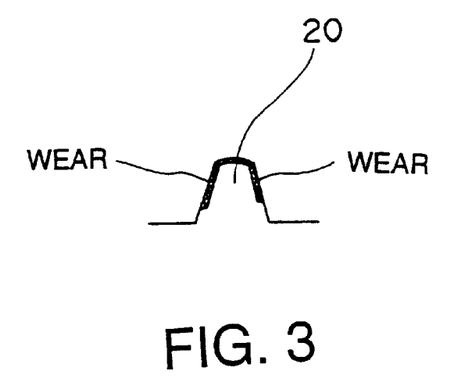
FIG. 3 is a magnified view of a worn tooth surface of the ring gear as seen from the direction of gear axis.
Figure 4:
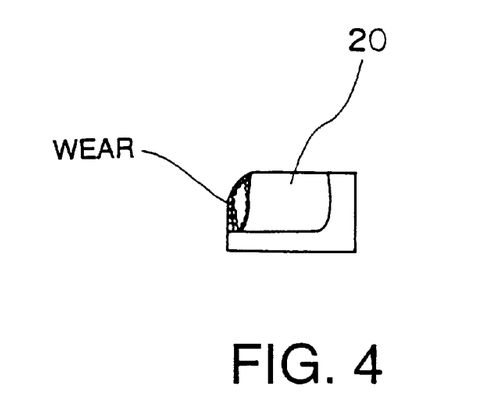
FIG. 4 is a magnified view of the worn tooth surface of the ring gear as seen from the direction of a tangent to the ring gear.

FIG. 3 shows damage of the teeth 20 as seen from the direction of gear axis, and FIG. 4 shows damage of the teeth 20 as seen from the direction of a tangent to the ring gear 10.

The section B of the ring gear 10 remote from the wear section A is preferable for the detection section of the magnetic sensor 15.

In the case of the four-cylinder engine, the section shifted by 90° from the wear section is the least wearing section, and in the case of the six-cylinder engine, the section shifted by 60° from the wear section A is the least wearing section.

Figure 5:
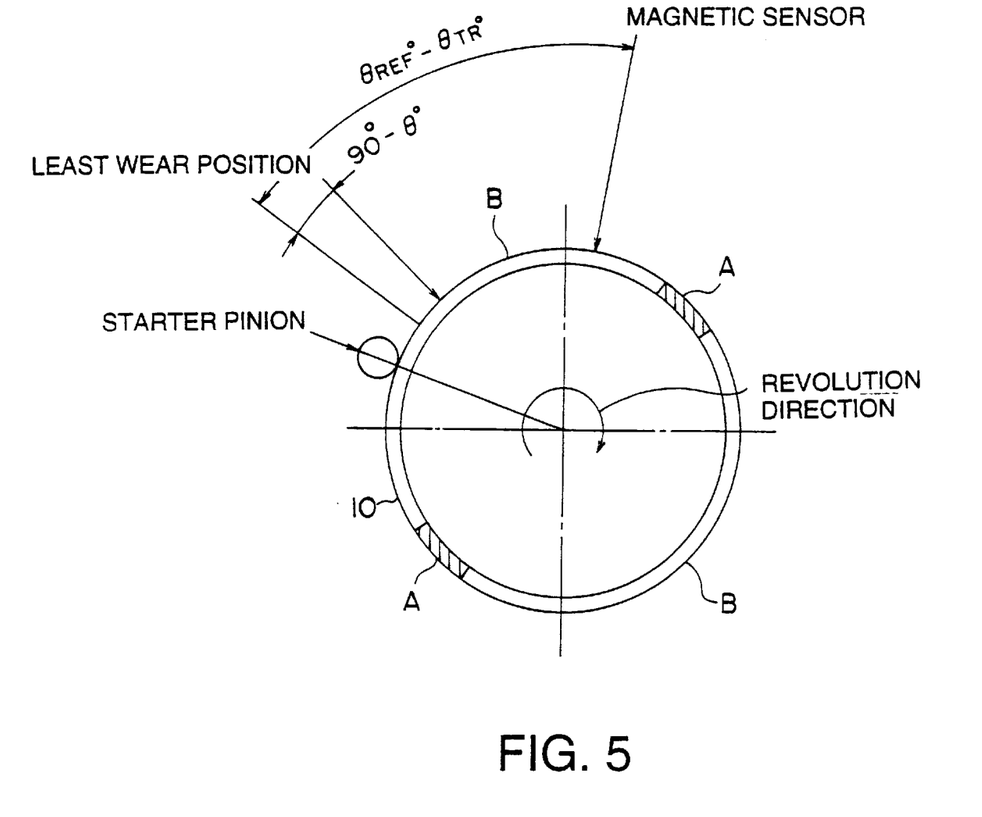
FIG. 5 is similar to FIG. 2, but showing a rotating position of the ring gear upon output of REF signal.

Suppose the reference sensor 18 outputs the first reference signal when the engine shown in FIG. 2 rotates from the stopping position to the position in FIG. 5. The magnetic sensor 15 is installed at a position capable of detecting the tooth tip of the least wearing detection section B of the ring gear 10 continuously from the reference signal output.

That is, supposing the timing of output of the reference signal from the reference sensor 18 to be $\theta_{REF}$ from the TDC, and the timing of the rotating resistance of the engine reaching maximum to be $\theta_{TR}$ from the TDC, the angle of the maximum wear position of the ring gear 10 and the output position of reference signal is $(\theta_{REF}-\theta_{TR})$. Supposing the angle of the mounting position of the starter motor 14 and the mounting position of the magnetic sensor 15 to be θ, the wear of the ring gear 10 is minimum at the position shifted 90° from the maximum wear position of the ring gear 10 in the case of four-cylinder engine, and hence shifting $(\theta_{REF}-\theta_{TR})$ backward from the position of the magnetic sensor 15 in FIG. 5, the position shifted (90° -θ) forward therefrom is the minimum wear position of the ring gear 10. In the case of the six-cylinder engine, similarly, shifting $(\theta_{REF}-\theta_{TR})$ backward, the position shifting (60° -θ) forward therefrom is the minimum wear position of the ring gear 10.

Therefore, by detecting the number of passing teeth in the minimum wear section, it is possible to detect the rotation angle accurately without effect of wear.

When the mounting position and detection section of the magnetic sensor 15 are determined in the first place, the starter motor 14 is installed so that the wear section A of the ring gear 10 may not coincide with the detection section, but in this case, on the basis of the engine stopped state, the region ahead of the position of the starter motor 14 by a specified angle is the wear section A of the ring gear 10. Thus the position of the starter motor 14 can be set easily.

Figure 6:
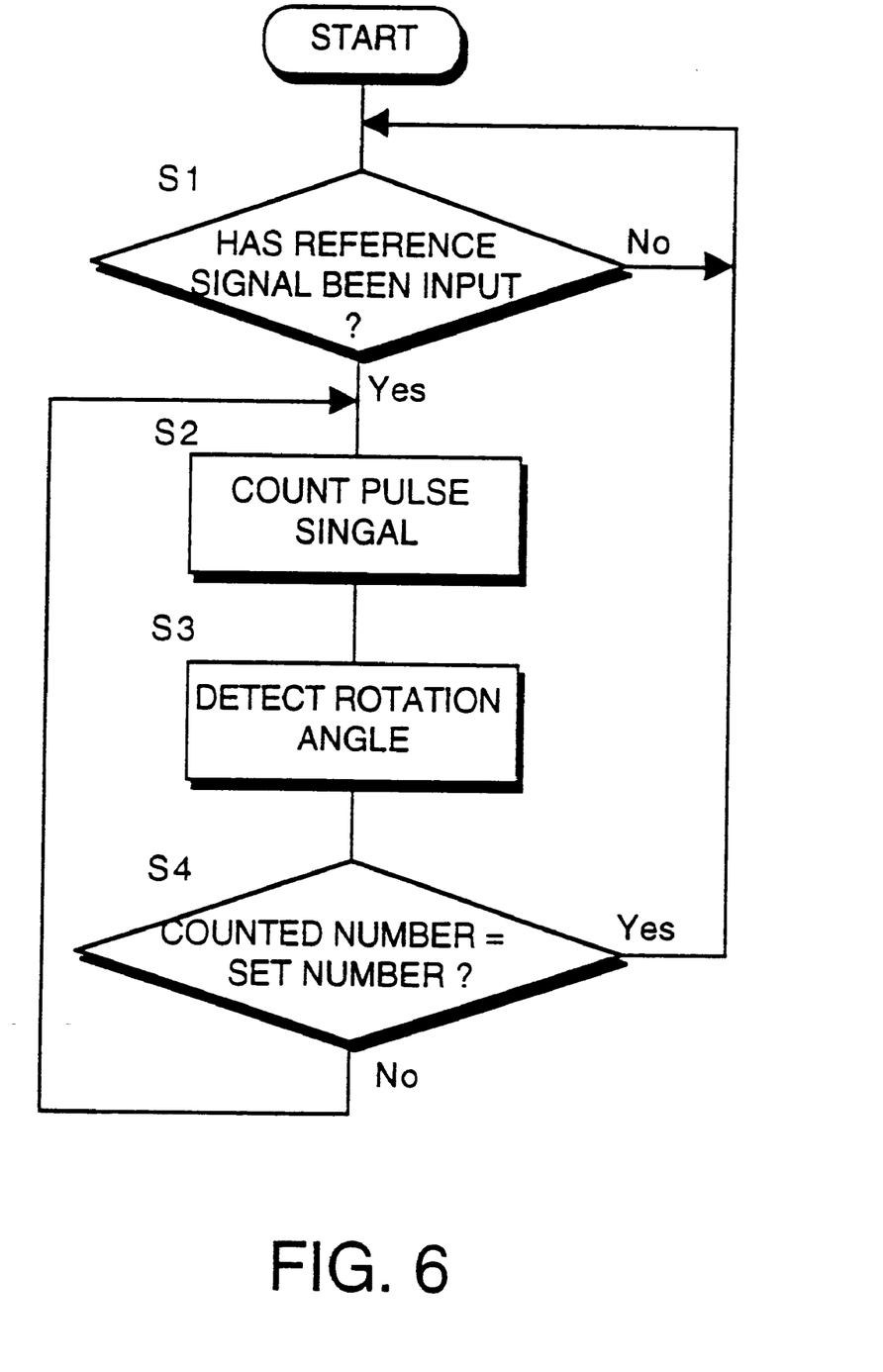
FIG. 6 is a flow chart showing a detecting process of rotation angle according to this invention.

When the reference signal is output from the reference sensor 18, the detecting circuit 17 starts counting the signals and finishes counting after counting a specified number. This operation is repeated every time the reference signal is output as expressed by steps S1 to S4 in FIG. 6.

In this way, by making use of the less wearing detection section remote from the reference signal by a specific section, the rotation angle can be detected accurately.

Figure 8:
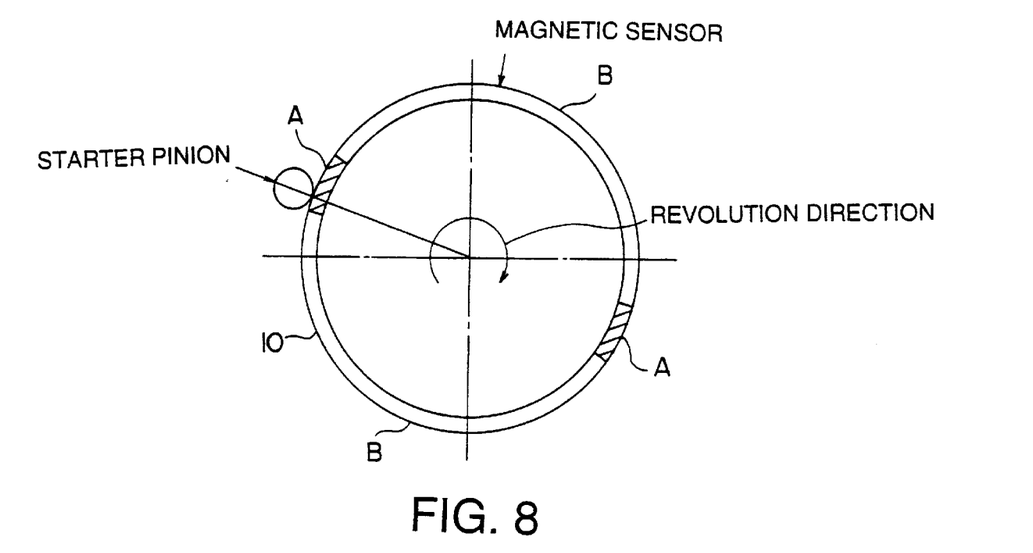
FIG. 8 is similar to FIG. 2, but showing a rotating position of the ring gear at TDC of a reference cylinder.
Figure 9:
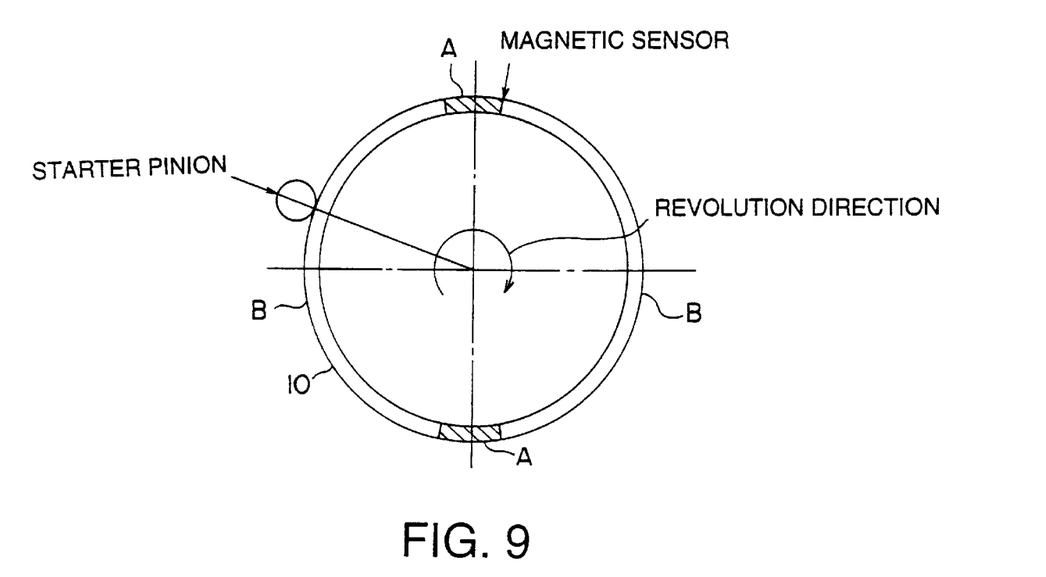
FIG. 9 is similar to FIG. 2, but showing a rotating position of the ring gear at the end of angle detection.

FIG. 8 shows the state of the ring gear 10 when it is moved from the REF position in FIG. 5 to the TDC position. FIG. 9 shows the state of the ring gear 10 when the detecting section has passed the magnetic sensor 15.

FIGS. 10 to 17 relate to a second embodiment of this invention.

In this embodiment, the wear section G of the ring gear 10 which is worn as the starter pinion 16 of the starter motor 14 jumps into the ring gear 10 upon start of the engine is shifted from the detection section of the magnetic sensor 15.

Figure 10:
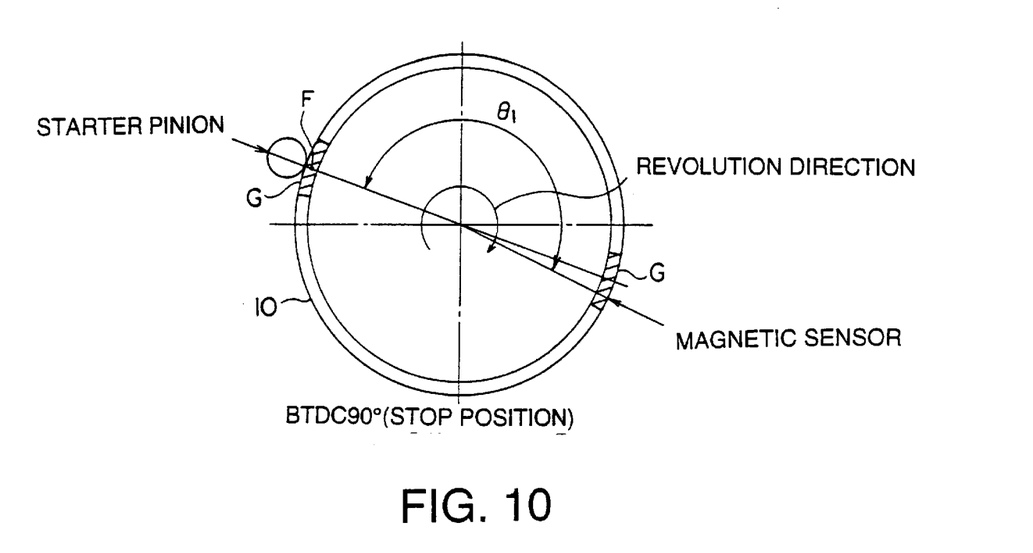
FIG. 10 is a diagram showing a rotating position of the ring gear when the engine is stopped, according to a second embodiment of this invention.

In this case, the wear section G of the ring gear 10 is the region of the teeth of the ring gear 10 engaged with the starter pinion 16 of the starter motor 14 in the engine stopped state as shown in FIG. 10. That is, the engine stops at a specified position where the rotating resistance becomes 0 after the top dead center of the piston, and hence the position of promoting wear of the ring gear 10 by jumping and driving of the starter pinion 16 upon start is the starter motor corresponding position while the engine is stopped. The wear section G occurs in two positions as shown in FIG. 10 in the four-cylinder engine, and three positions in the six-cylinder engine, per revolution of the engine.

This embodiment is configured so that the magnetic sensor 15 detects the number of passing teeth by making use of the section remote from the wear section G of the ring gear 10.

The detection section of the magnetic sensor 15 is described by reference to FIG. 11. The number indicated by i is the cylinder number, showing the TDC position of the corresponding cylinder. The REF signal from the reference sensor 18 is output at a specific angle $\theta_5$ before the TDC of each cylinder (for example, BTDC70°).

Upon output of the REF signal, starting to count the signal pulses of the magnetic sensor 15, it is over when counting a specified number (n+m), where n is the number of teeth in the section X from the REF signal time ($\theta_5$ before TDC) to $\theta_3$ after TDC (for example, ATDC15°), and m is the number of teeth in section Y from $\theta_3$ after TDC to $\theta_3+\theta_4$ (for example, 70°).

Measuring the time t required for counting the number of teeth in the section Y, by comparing with the count time $t_0$ one cycle before of the same cylinder or count time $t_8$ of another cylinder, it is determined that the cylinder has misfired if, for example, the difference is large.

In the section Z from the end of counting of number of teeth m till next REF signal. The section Z corresponds to $\theta_5$ (for example, 25°) in FIG. 11. Therefore, if the teeth of the ring gear passing through the magnetic sensor 15 in this section Z are worn or damaged, it has no effect on the detecting precision.

Figure 12:
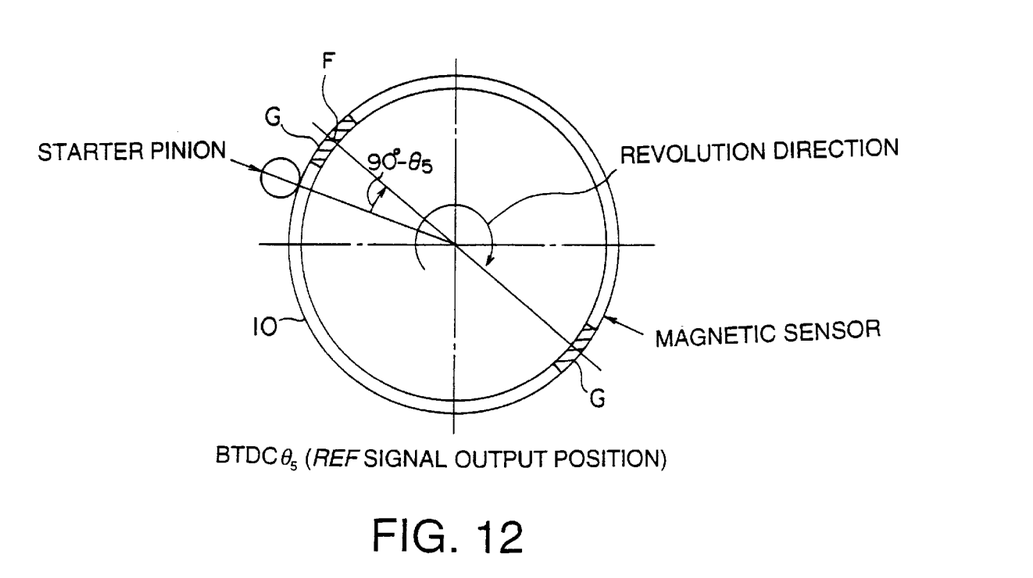
FIG. 12 is similar to FIG. 10, but showing a rotating position of the ring gear upon output of REF signal.
Figure 13:
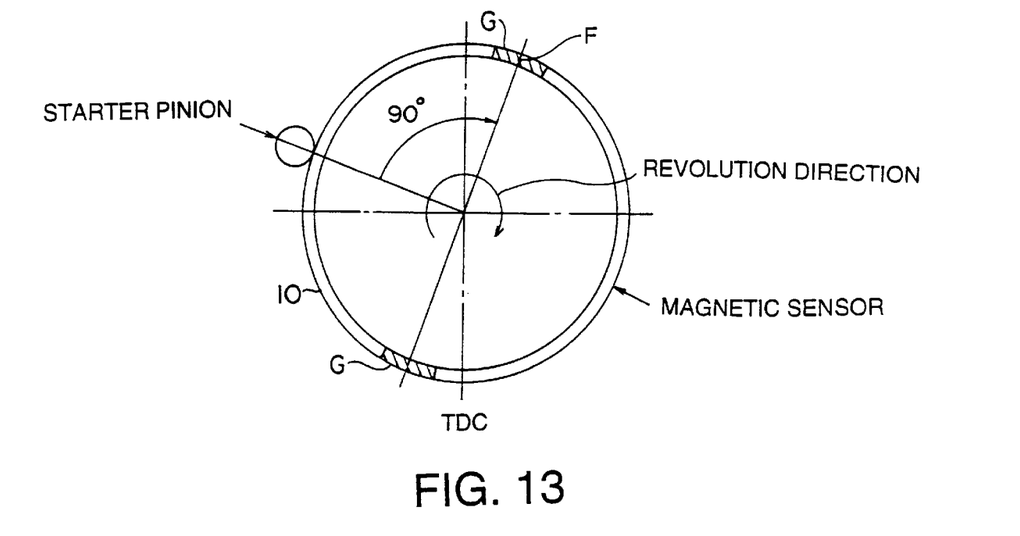
FIG. 13 is similar to FIG. 10, but showing a rotating position of the ring gear at TDC of the reference cylinder.
Figure 14:
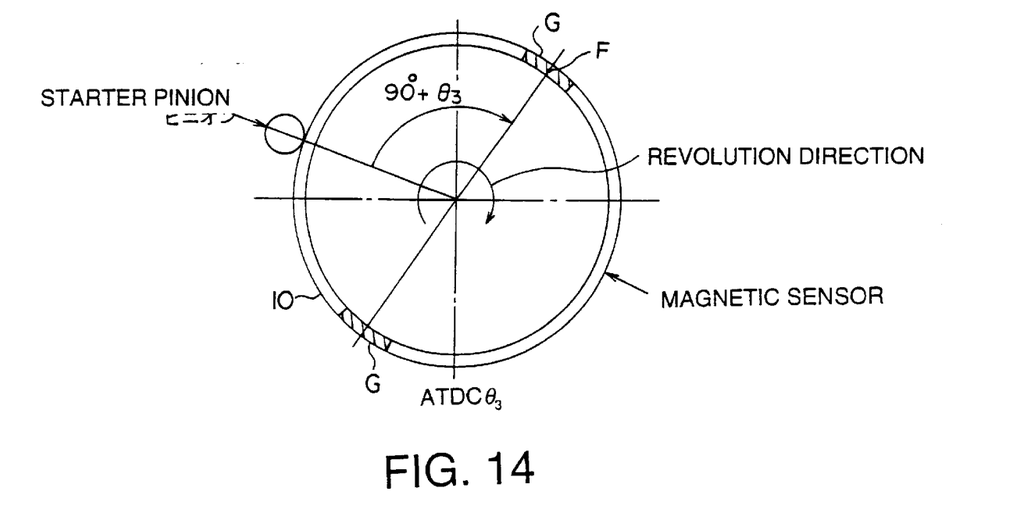
FIG. 14 is similar to FIG. 10, but showing a rotating position of the ring gear upon start of angle detection.

If the reference sensor 18 outputs a REF signal at the position shown in FIG. 12, the magnetic sensor 15 is installed at such a position where the wear section G of the ring gear 10 has just passed at the moment of the REF signal output.

Figure 16:
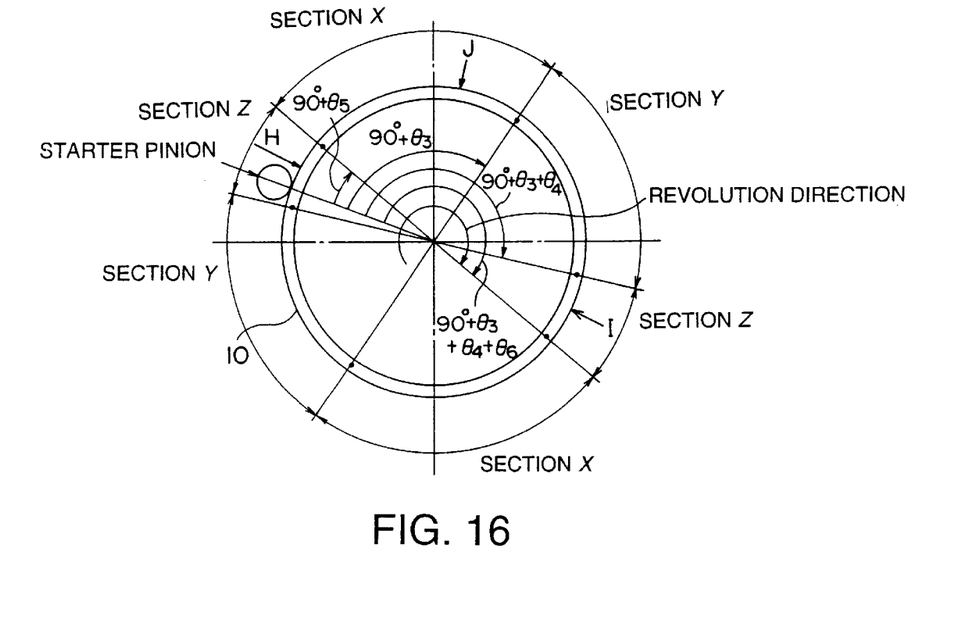
FIG. 16 is a diagram showing a trajectory of a wear section and timing of angle measurement according to the second embodiment.
Figure 17:
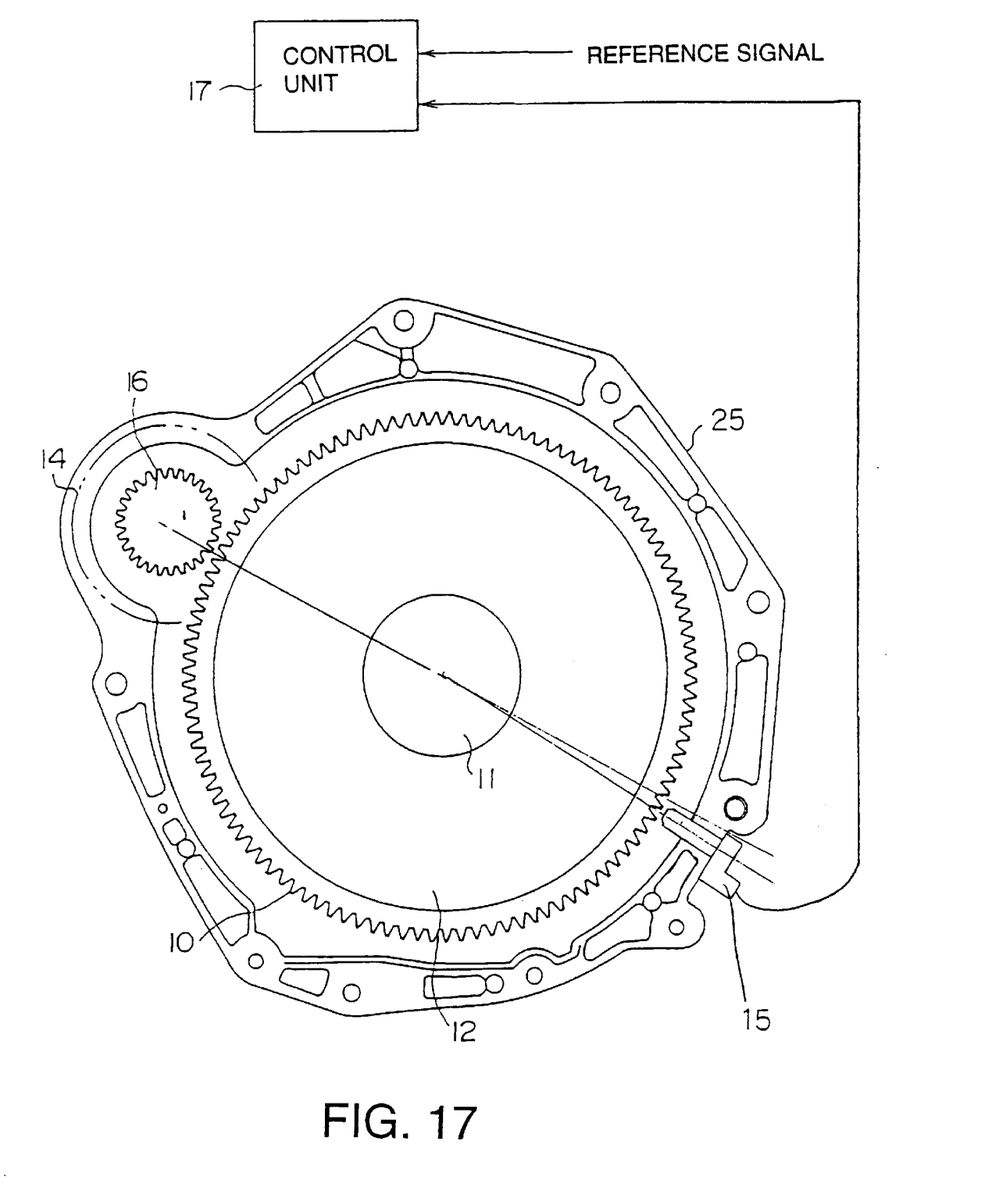
FIG. 17 is a schematic diagram of a rotation detecting apparatus according to the second embodiment.

In other words, the wear section G of the ring gear 10 is the starter motor corresponding position when the engine is stopped, and therefore in the case of the four-cylinder engine, the magnetic sensor 15 is installed at the position H immediately before the position of the starter motor 14 as shown in FIG. 16, or at the position/symmetrical to the position H. FIG. 17 shows the latter configuration.

Figure 11:
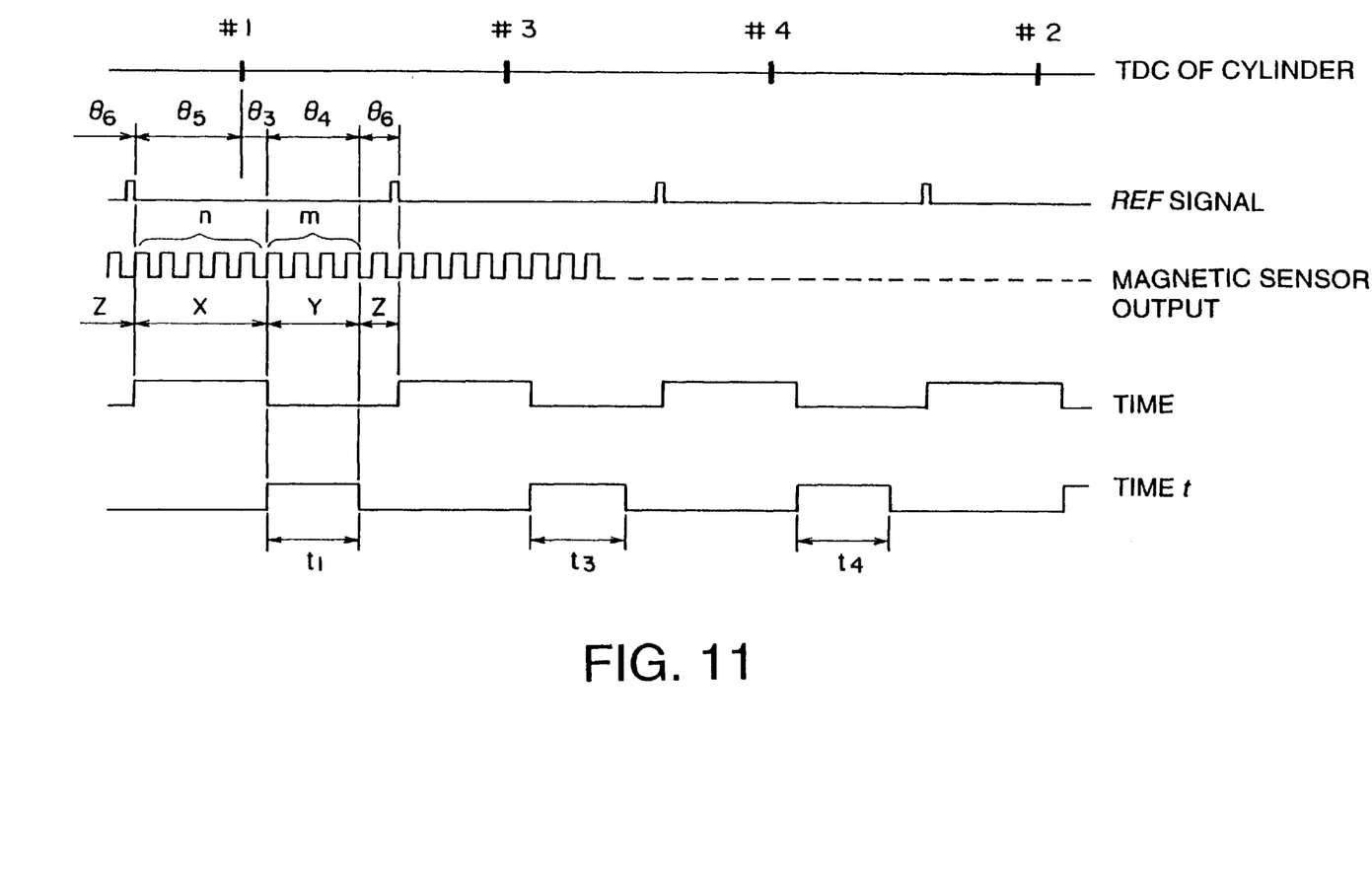
FIG. 11 is a timing chart showing an angle detecting section according to the second embodiment.
Figure 15:
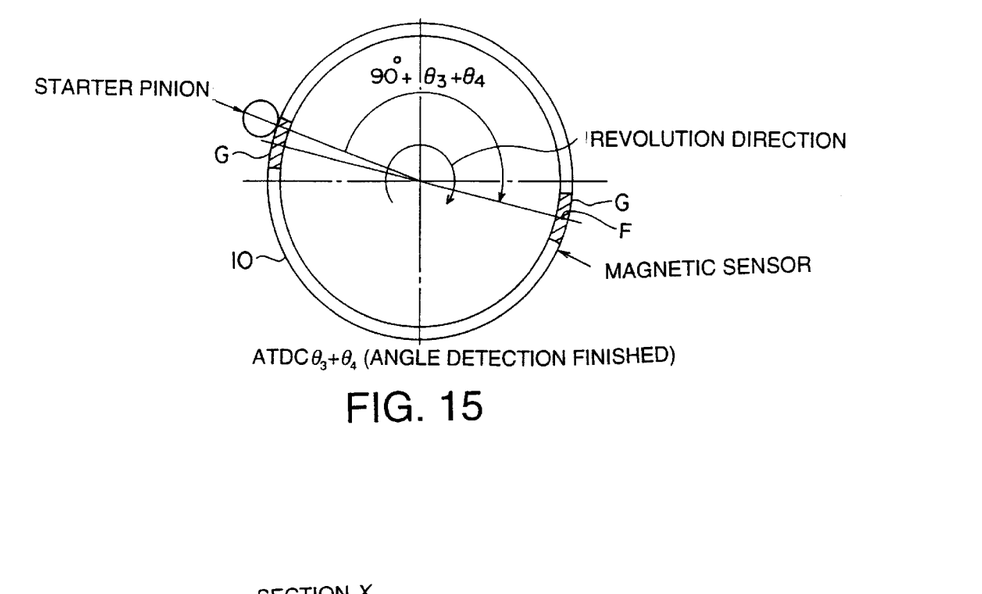
FIG. 15 is similar to FIG. 10, but showing a rotating position of the ring gear at the end of angle detection.

In the case of the four-cylinder engine, when the engine rotates from the BTDC90° to the BTDC$\theta_5$ in FIG. 12, it gets into section X in FIG. 11. Passing the position of TDC shown in FIG. 13, finishing the section X at TDC+$\theta_3$ shown in FIG. 14, it gets into section Y. Then, the section Y is terminated at TDC+$\theta_3+\theta_4$ as shown in FIG. 15.

The trajectory of center F of the wear section G of the ring gear 10 and the measurement timing are shown in FIG. 16. The magnetic sensor 15 may be installed at either position H or I. In this case, the angle $\theta_1$ of mounting position of the magnetic sensor 15 relative to the starter motor 14 is $90°+(\theta_3+\theta_4)>\theta_1>90°+(\theta_3+\theta_4)+\theta_6$, and, for example, supposing $\theta_3=15°$, $\theta_4=70°$, $\theta_5=25°$, it is installed at the position of $175°>\theta_1 200°$ or $-5°>\theta_1>20°$.

Incidentally, the magnetic sensor 15 may be also installed at the position indicated by J in FIG. 16. In this case, the angle $\theta_1$ of the mounting position of the magnetic sensor 15 relative to the position of the starter motor 14 is $90°-\theta_5>\theta_1>90°+\theta_3$, so that the wear section G of the ring gear 10 overlaps with section X. If the teeth are worn in section X, however, only the start position of section Y is deviated, and there is no effect on the counting precision of the number of teeth in the section Y. In the case of the six-cylinder engine, since the interval of the wear section and next wear section is small, setting of section Y is difficult, but by allowing overlap of wear section G and section X, the setting range of the section Y is extended.

The embodiments of this invention in which an exclusive property or privilege is claimed are defined as follows:

What is claimed is:

1. An apparatus for continuously detecting a rotation angle in a specific range of a crankshaft of an engine, said engine having a piston reciprocating between a top dead center and bottom dead center, comprising:

a ring gear having teeth and coupled with said crankshaft, a starter motor for rotating said ring gear, a starter pinion coupled with said motor, said pinion having teeth to be engaged with said ring gear teeth when starting up said engine, a magnetic sensor for outputting a signal according to the passing of teeth in a specific range of said ring gear, said specific range being set so as not to overlap with a wear region of said ring gear teeth which is worn due to engagement with said pinion, and means for detecting a rotation angle of said crankshaft based on said signal.

2. An angle detecting apparatus as defined in claim 1, wherein said wear region is a region to be engaged with the teeth of said pinion at a point before the top dead center of said piston where a rotating resistance of said engine becomes large when starting up said engine.

3. An angle detecting apparatus as defined in claim 1, wherein said wear region is a region to be engaged with the teeth of said pinion when said engine is not operating.

4. An angle detecting apparatus as defined in claim 3, wherein said magnetic sensor is installed at either a first position slightly rotated from the position of the starter motor in the rotating direction of said ring gear, or a second position rotated 180 degrees around the center of said ring gear from said first position.

5. An angle detecting apparatus as defined in claim 1, wherein said apparatus further comprises a sensor for outputting a reference signal corresponding to a specific rotation position of said crankshaft and said detecting means starts detecting the rotation angle with said reference signal.

6. An angle detecting apparatus as defined in claim 1, further comprising means for detecting a rotation speed of said crankshaft from said signal output by said magnetic sensor.

7. An apparatus for continuously detecting a rotation angle in a specific range of a crankshaft of an engine, said engine having a piston reciprocating between a top dead center and bottom dead center, comprising:

a ring gear having teeth and coupled with said crankshaft, a starter motor for rotating said ring gear, a starter pinion coupled with said motor and having teeth to be engaged with said ring gear teeth when starting up said engine, said teeth of said ring gear having a wear region according to the engagement with said teeth of said starter pinion, a magnetic sensor for detecting a tooth of said ring gear that passes said sensor and outputting a corresponding signal, said tooth being situated in a specific angular range of said ring gear and said sensor being displaced such that said specific angular range and said wear region do not overlap, thereby to reduce dependency of the signal on wear of said ring gear teeth due to engagement with said pinion, and means for detecting a rotation angle of said crankshaft based on said signal.

8. An angle detecting apparatus as defined in claim 7, wherein said magnetic sensor is installed at either a first position slightly rotated from the position of the starter motor in the rotating direction of said ring gear, or a second position rotated 180 degrees around the center of said ring gear from said first position, thereby to further reduce dependency of the signal on wear of said ring gear teeth.

* * * * *